Feb. 9, 1937.　　　　　J. MANTELET　　　　2,070,137
MASHER
Filed May 4, 1935
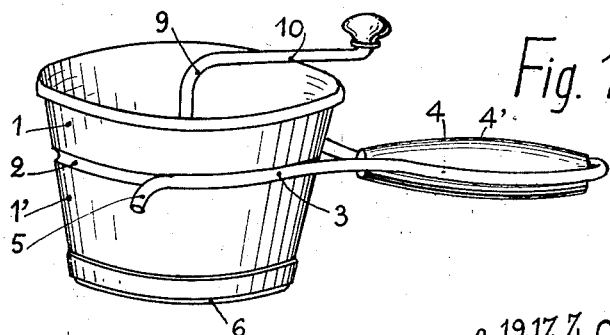
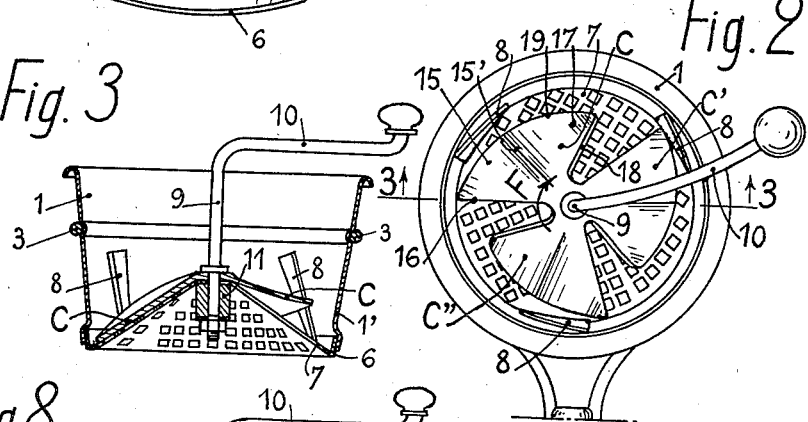
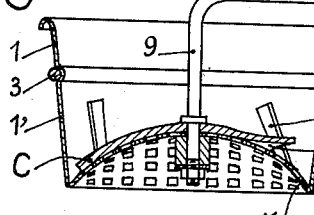
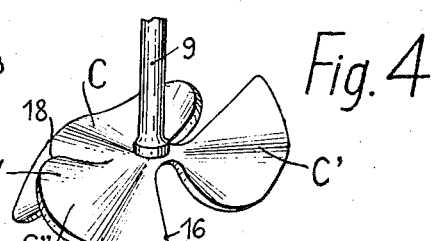
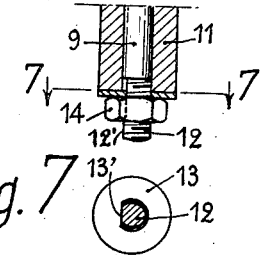
Inventor: Jean MANTELET
by C. A. Snow & Co.
Attorneys.

Patented Feb. 9, 1937

2,070,137

UNITED STATES PATENT OFFICE 2,070,137

MASHER

Jean Mantelet, Bagnolet, France, assignor to Mantelet & Boucher (Societe en nom Collectif), Bagnolet, France Application May 4, 1935, Serial No. 19,891
In Luxemburg August 3, 1934

4 Claims. (Cl. 146—175)

The present invention relates to mashers for the treatment of vegetables, cheese and other matters and capable of mashing fibrous vegetables and meat.

There exist mashers including a vessel the perforated bottom of which acts as a strainer, of plane concave, or convex shape, in which the squeezing of the matter to be treated against said strainer is obtained by rotating, about an axis passing through the center of said strainer, a member the under surface of which is of helical shape, the upper edge of said surface catching the matter to be treated between itself and the strainer, and the lower edge of said surface being adapted to slide in contact with said strainer. The matter caught between the under surface of said squeezing member and the strainer is squeezed by the rotation of said member and forced through the perforations of the strainer.

In mashers of this type, the portion of the strainer that is located under the squeezing member is subjected to relatively important pressures which are maximum in the vicinity of the lower edge of the squeezing member, while the remainder of the surface of the strainer does not support any pressure. Therefore, due to the uneven distribution of the pressure, the strainer works under defective conditions and therefore wears rather rapidly. As for the spindle that carries the squeezing member, it is continuously subjected to a bending stress due to the dissymmetrical distribution of the pressure on the strainer.

The object of the present invention is to obviate this drawback.

The essential feature of the masher according to the present invention is that its squeezing member consists of a plurality of elements each having a helical under surface, these surfaces being preferably identical and evenly distributed about the spindle through which they are driven.

According to another feature of the present invention, each of these helical surfaces is prolonged upwardly by another surface, which is not so inclined that the surface serving to produce the squeezing of the matter and which will be hereinafter called "introduction surface", the portion of said introduction surface close to the upper edge thereof being preferably curved upwardly.

Owing to the provision of a plurality of squeezing elements, to the fact that these elements are all identical and evenly distributed about their common axis, the reactions due to the squeezing of the matter in the apparatus are balanced with respect to said axis. Furthermore, the amount of matter that is strained for each revolution of the system is substantially greater than in apparatus having only one squeezing element.

On the other hand, owing to the provision, in connection with each squeezing element, of an introduction surface of reduced inclination, the matter that has escaped from one squeezing element is caught by the introduction surface of the next squeezing element much more easily than if the introduction surfaces had the same inclination as the squeezing surfaces.

Other features of the present invention will result from the following detailed description of some specific embodiments of said invention.

Preferred embodiments of the present invention will be hereinafter described with reference to the accompanying drawing, given merely by way of example, and in which:

Fig. 1 is a perspective view of a masher according to the present invention;

Fig. 2 is a corresponding plan view;

Fig. 3 is a sectional view on the line 3—3 of Fig. 2;

Figs. 4 and 5 are perspective views, from different angles, of a rotary spindle carrying three squeezing elements rigidly fixed thereto;

Fig. 6 is a vertical sectional view showing the mounting of said spindle;

Fig. 7 is a sectional view on the line 7—7 of Fig. 6;

Fig. 8 is a vertical sectional view of another embodiment of the invention in which the strainer is of spherical shape.

The masher shown in the drawing includes a vessel having a lateral wall 1 of conical shape, the lower part 1' of which is of restricted section. Under the surface 2 that joins the conical portions 1 and 1' are inserted, and fixed, for instance by soldering, the branches 3 of a fork-shaped element between the middle parts 4 of which is inserted a handle 4 of wood or any other material which is not a good conductor of heat. The ends 5 of the branches 3 of said element are bent in a downward direction so as to form kind of hooks intended to support the apparatus on the vessel that is intended to receive the mashed matter having passed through the strainer.

This strainer, which is constituted by the perforated bottom 7 (Fig. 3) of the apparatus, is fixed through its flange 6, for instance by soldering, on the lower end of portion 1'. In a hub 11, carried by said strainer, at its center, is journalled a spindle 9, provided, at its upper end with a crank 10. On this spindle 9 are keyed three squeezing elements C, C', and C'' (Figs. 2 to 5), all of the same shape and evenly distributed about spindle 9.

Each of these squeezing elements consists of a portion of helical surface 15, the lower edge of which is in contact with strainer 7, and which is joined at 15' with a curved introduction surface 17 the upper edge 18 of which is turned upwardly. The inclination of this introduction surface 17 is less accentuated, as a whole, than that of the squeezing surface 15. The peripheral edge 19 of each squeezing element, the lower end of which is substantially in contact with the wall 1' of the apparatus, grows farther from said wall 1' when moving along said peripheral edge in an upward direction, up to the upper edge 18 of the introduction surface, so as to leave, between said peripheral edge and said wall 1' a space that increases from the lower part toward the upper part of said peripheral edge.

Spindle 9 is provided, at its lower end, with a threaded portion 12 having a flat side 12'. On this threaded portion is slipped a small disc 13 provided with a hole having also a corresponding flat side 13'. A nut 14 is screwed on this threaded portion so as to permit of applying the squeezing elements against the matter to be treated with a sufficient pressure. Owing to this arrangement, disc 13 is driven together with spindle 9 in its rotary movement and nut 14 remains in the position in which it has been fixed.

On the inner side of wall 1' are also fixed scraping blades 8, the edges of which are located opposite the peripheral edges of the squeezing elements and the width of which decreases gradually from top to bottom, so as to become zero at the lower end. The function of these scraping blades is to disintegrate the matter to be treated when the latter is being driven along by the squeezing elements.

When crank 10 is rotated in the direction of arrow F (Fig. 2), each squeezing element C attacks, through the upper edge 18 of its introduction surface, the matter to be treated present in the apparatus. The introduction of this matter under the squeezing elements is facilitated by the curved shape of this introduction surface. The matter to be treated is then squeezed between the squeezing element and the strainer 7, which thus forces said matter to pass through the holes of perforated bottom 7.

The scraping blades are intended to facilitate the disintegration of the matter to be treated, which is caused to rub on the one hand against the edges of said scraping blades, and, on the other hand, against the peripheral edge of the corresponding squeezing element.

It should be noted that the stresses resulting from the pressures transmitted to the strainer by the squeezing elements are suitably balanced owing to the regular distribution of these elements about spindle 9. Furthermore, owing to the multiplicity of the squeezing elements, the number of turns of crank 10 that is necessary for causing a predetermined amount of matter to pass through the strainer is greatly reduced.

In the embodiment shown by Fig. 8, the strainer 7' is given the shape of a portion of a sphere, the squeezing elements C, C' and C'' being, of course, made of corresponding shape.

Of course, the number of squeezing elements, and that of scraping blades shown in the appended drawing have been given merely by way of example.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A masher which comprises, in combination, a vessel having a perforated bottom adapted to act as a strainer, a plurality of squeezing members pivoted in said vessel about a common axis, the lower edge of each of said members being so shaped as to slide in contact with said bottom and the under surface of said member consisting of two helical portions, one with a larger pitch, which is adjacent to said lower edge, and one with a smaller pitch which forms an introduction surface at the upper part of said member, and means for rotating simultaneously all of said members about said axis.

2. A masher according to claim 1 in which the upper edge of said introduction surface is curved upwardly.

3. A masher which comprises, in combination, a vessel having a perforated bottom adapted to act as a strainer, a plurality of rotary squeezing members pivoted in said vessel about a common axis passing through the center of said bottom, the lower edge of each of said members being so shaped as to slide in contact with said bottom and the under surface of said member consisting of two helical portions, one with a larger pitch, which is adjacent to said lower edge, and one with a smaller pitch which forms an introduction surface at the upper part of said member, all of said members being of the same shape and fixed at equal angular intervals about said spindle, and means for rotating simultaneously all of said members about said axis.

4. A masher according to claim 3 in which the upper edge of said introduction surface is curved upwardly.

JEAN MANTELET.